May 11, 1926.
W. P. RUDKIN
1,584,657
INTERNAL COMBUSTION ENGINE
Filed Jan. 17, 1923     4 Sheets-Sheet 3
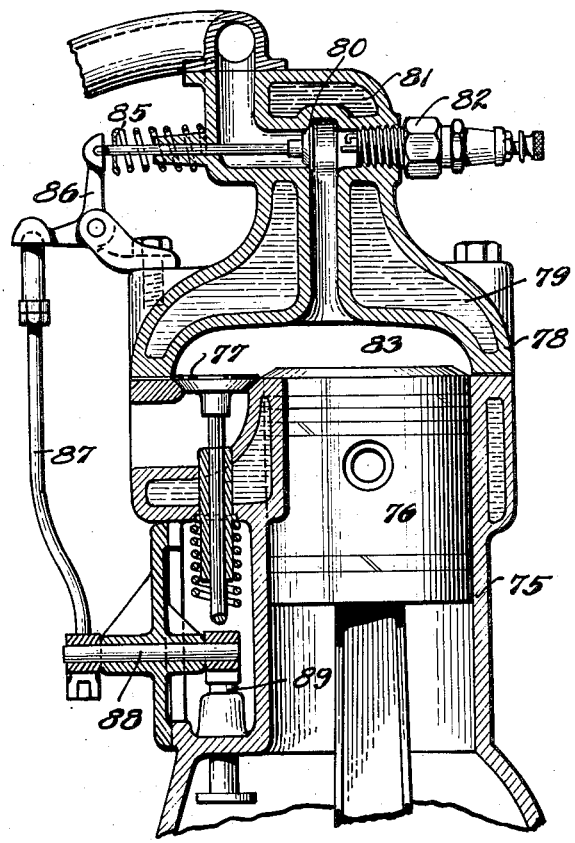
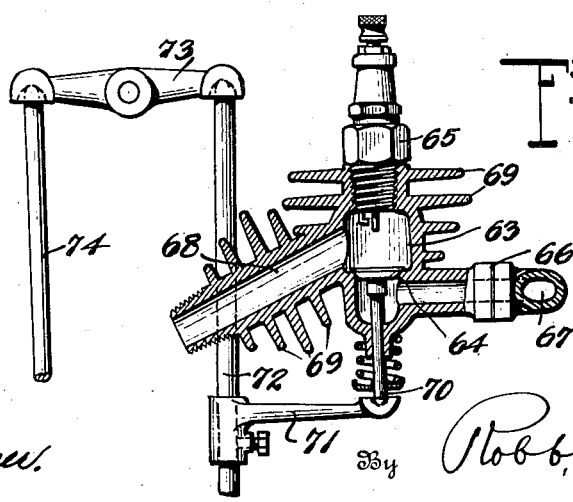
Inventor
W. P. Rudkin May 11, 1926.
W. P. RUDKIN
1,584,657
INTERNAL COMBUSTION ENGINE
Filed Jan. 17, 1923
4 Sheets-Sheet 4
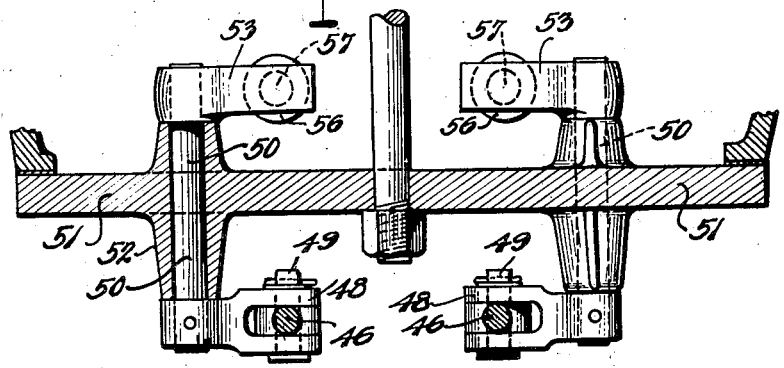
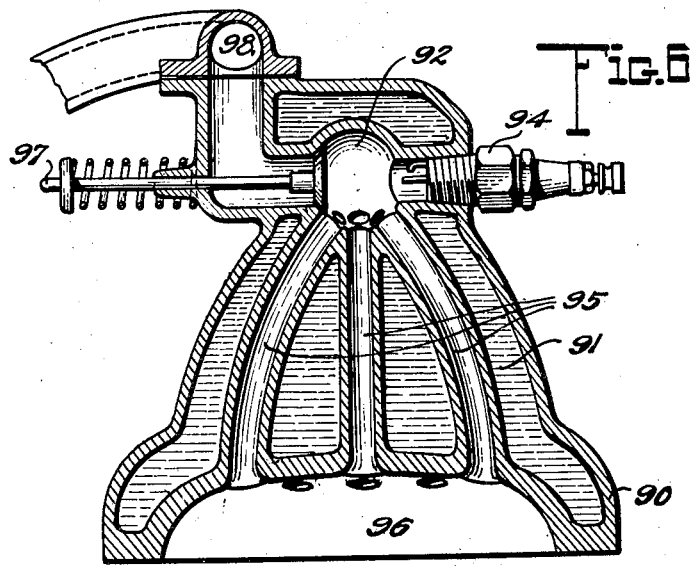

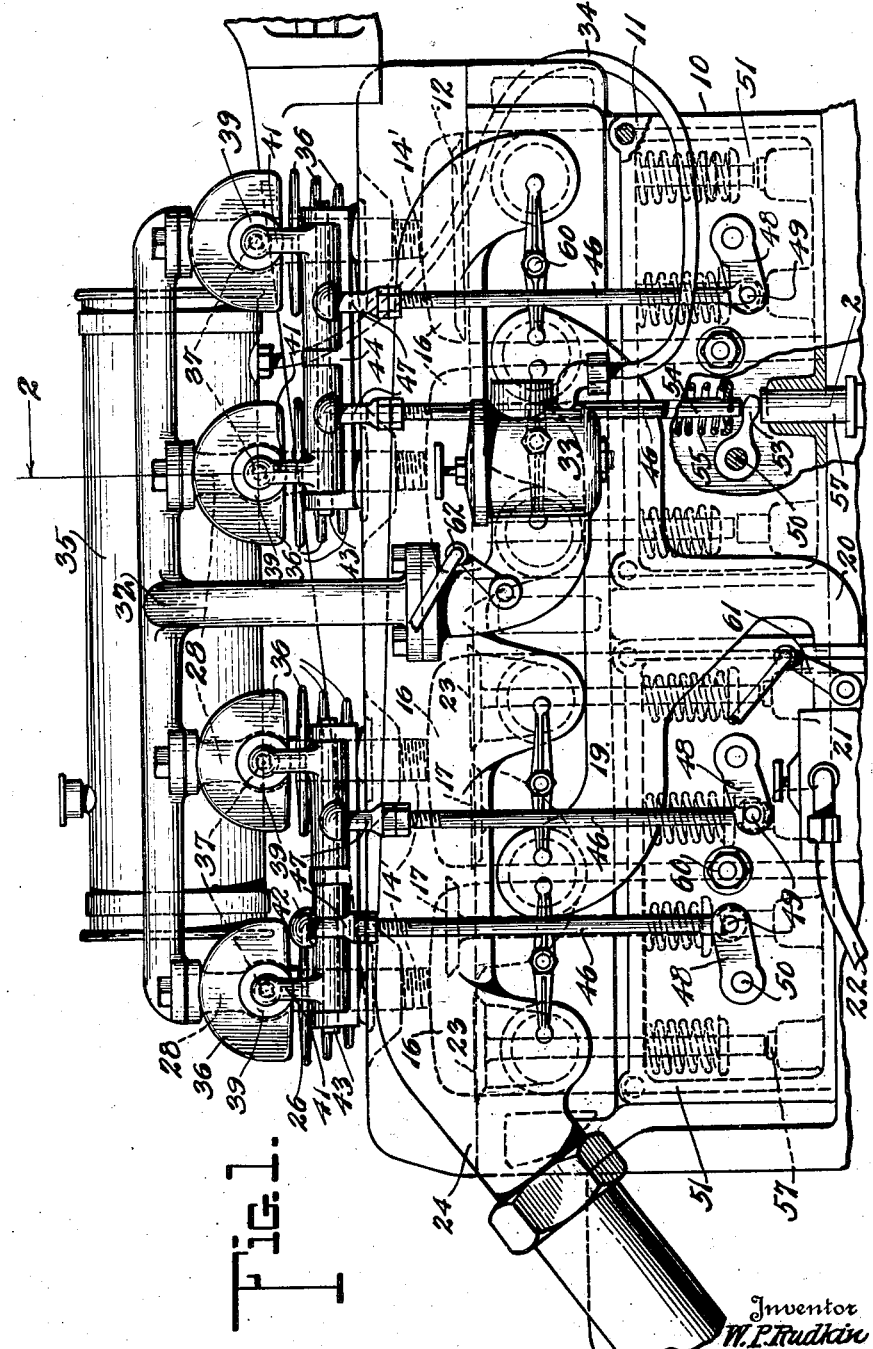

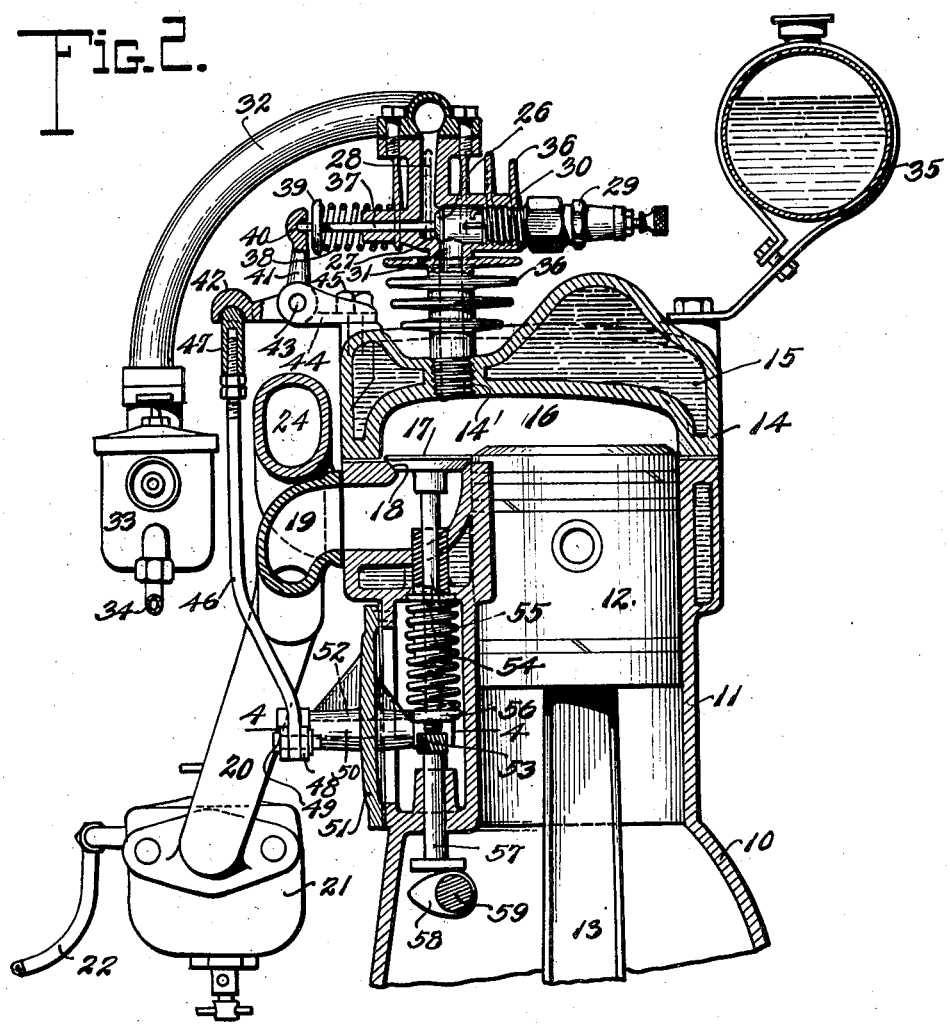

Patented May 11, 1926.

1,584,657

UNITED STATES PATENT OFFICE.

WILLIAM PAUL RUDKIN, OF OKLAHOMA CITY, OKLAHOMA.

INTERNAL-COMBUSTION ENGINE.

Application filed January 17, 1923. Serial No. 613,199.

This invention relates to an internal combustion engine and particularly to an improvement upon the construction shown in my pending application filed October 31, 1921, Serial No. 511,688.

This invention seeks primarily to secure a complete combustion and expansion of a fuel of low volatility, such as crude oil and the like, which in the prior art have been inefficiently vaporized and compressed prior to ignition. As is well known, the maximum power is secured through a high compression and expansion of the low grade fuel as in the Diesel type of engine, but such constructions require supplemental pumping means to secure the compression and depend upon the expansion of the fuel by contact with the high temperature of the cylinder. It has been found that at the point of vaporization of most fuels of low volatility, such as crude oil, the lower the volatility the greater the expansion thereof. The fuels of high volatility, such as gasoline, have lower breaking points which require less heat in order to expand. When the fuel of high volatility is ignited or exploded it therefore produces an initial expansion which acts upon the body of low volatile fuel so as to supplement the engine compression thereof which results in a disintegration of the fine particles and a complete combustion and expansion which increases the power relative to the amount of fuel.

This invention therefore seeks to provide means by which a fuel of low volatility is introduced at a cylinder head and receives its primary compression in the action of the engine. At substantially the same time a fuel of high volatility is introduced into an auxiliary firing chamber which communicates with the cylinder through a relatively restricted passage so as to avoid commingling with the fuels and consequent effect upon their product by the reduction of the volatility of the high grade fuel. When the latter is ignited the expansion thereof acts downwardly upon the body of low grade fuel in the cylinder and effects a supplemental compression thereof which secures the most effectual results in the expansion of the fuel of low volatility at the instant of its ignition. The operation just referred to is practically instantaneous so that the main fuel charge is exploded at a silghtly slower rate from the charge of high volatility because the heavier oil is under a denser or higher compression and the firing charge ignites first and is quicker in action.

This improvement, while embodying the essential features of the main and auxiliary charges of different volatility disclosed in my prior application before mentioned, provides means by which the supplemental valve to control the high grade charge may be applied to engines of well known types and connections for operating such valve adapted for application to the usual main valve controlling mechanism.

Another object of the present invention is to provide an improved construction of the auxiliary valve chamber by which the valve therein is disposed so as to be directly accessible upon the removal of the usual spark plug and can be thus easily withdrawn for cleaning or replacement. The arrangement of the conducting passage from this auxiliary valve also provides for the application of the pressure from the initial firing directly upon the surface of the charge of low volatility already partially compressed within the cylinder. The intake valves for the fuels of high and low volatility are adapted to be simultaneously actuated in proper relation and the area thereof varied so as to secure the desired proportion of the charges as it is desirable to feed a larger amount of the low grade fuel than of the high grade fuel.

Other and further objects and advantages of the invention are hereinafter set forth and the novel features thereof defined by the appended claims.

In the drawings:

Figure 1 is a side elevation of the invention applied to an engine.

Figure 2 is a vertical section on substantially the line 2—2 of Figure 1.

Figure 3 is a detail section of a modified form of the invention applicable to an overhead valve type of engine.

Figure 4 is a detail enlarged section on approximately line 4—4 of Figure 2.

Figure 5 is a similar view of a modified form of the invention embodying a water cooled head and valve chamber.

Figure 6 is a vertical section of a modified form of head in which the auxiliary valve is provided with a plurality of feeding passages.

Like numerals refer to like parts in the several figures of the drawings.

The numeral 10 designates an engine structure which may be of any desired type or configuration and is herein shown with a vertically disposed cylinder 11 provided with a piston 12 from which the usual piston rod 13 extends. The head 14 for this cylinder may be water-jacketed as shown at 15 and provides a chamber 16 to receive fuel of low volatility, the intake of which is controlled by a valve 17 cooperating with a seat 18 as shown in Figure 2. The intake to this valve communicates with a manifold 19 from which the usual intake pipe 20 extends to a carburetor 21 of any usual type and is fed from the pipe line 22 communicating with a source of supply for crude oil, kerosene or any other fuel of relatively low volatility. The engine cylinder just referred to is provided with the usual exhaust valve 23, as indicated by dotted lines in Figure 1, which communicates with an exhaust manifold 24 in the usual manner. An auxiliary valve 26 for the control of the fuel of high volatility, such as gasoline or the like, is applied at the usual spark plug opening 14' in the type of engine shown in Figure 2. This valve may be of any preferred general construction and cooled in any desired manner. The auxiliary valve 27 in the preferred form of the invention controls the intake passage 28 and is disposed in alinement with a spark plug 29 of any desired type which is threaded into the boss 30 for that purpose. Extending from the valve 27 to the upper portion of the engine head is a feed passage 31 which is disposed in substantially a straight line so as to effect a direct downward pressure of the exploded fuel within this passage or chamber to most effectually compress fuel already filling the chamber 16 at the cylinder head. The fuel passage 28 is in communication with a feed pipe for fuel of high volatility such as shown at 32 which extends to a carburetor 33 of the usual form. From this carburetor the gas feed pipe 34 extends to a feed tank 35 disposed in any preferred location. For the purpose of cooling the auxiliary valve chamber 26 the walls thereof may be provided with fins or ribs 36 which effect the usual air cooling of parts. It will be noted that the size or area of the intake valve 27 for the fuel of high volatility is less than that of the valve 17 controlling the fuel of low volatility and thus a relative proportioning of the charges is effected.

The intake valve 27 may be actuated simultaneously with the valve 17 through any desired connections, such for instance as shown in my prior application, but I have herein disclosed a form of connection adapted for convenient attachment to the ordinary engine construction. In this form the stem 37 of the valve 27 is surrounded by a seating spring 38 which bears against a fixed part of the casing and also against a head 39 carried by the valve stem. This stem is extended beyond the head as at 40 and has a rocking seat in the vertical arm of the crank member 41, the horizontal arm 42 of which is adapted to be actuated by a connection from the fixed valve controlling mechanism of the engine. This crank arm is pivotally mounted at 43 upon a bracket 44 secured to the engine head by the bolts 45 thereof as shown in Figure 2.

The arm 42 of the crank member is actuated in its vertical movement by a push rod 46 having an adjustable head 47 and connected at its lower end to a lifter 48 by means of a pivot pin 49. This lifter extends laterally from a shaft 50 mounted in a bearing plate 51 by an elongated bearing 52 formed therein. The plate 51 is bolted to the usual valve case of the engine and replaces the ordinary closure plate used for that part.

The inner end of the rock shaft 50 carries a tappet finger 53 disposed beneath the stem 54 of the valve 17 controlling the intake to the cylinder head. This valve stem is surrounded by the usual closing spring 55 bearing against a fixed part and a head 56 carried by the stem. The stem of the valve 17 is actuated in the usual manner by a lifter 57 which also engages the interposed finger 53, and is actuated by the ordinary intake cam 58 upon a cam shaft 59 forming part of the usual engine construction. The plate 51 before described may be secured to the engine frame in any manner, for instance, by means of a nut and bolt 60 as indicated in Figure 4.

For the purpose of controlling the flow of fuel through the intake manifolds each of the carburetors may be provided with any desired form of throttle, for instance, a throttle 61 is applied to the carburetor 21 for the fuel of low volatility and a throttle 62 controls the intake of the fuel of high volatility. These throttles may be operated by any suitable connections and are particularly desirable in the starting action of the motor under which conditions the throttle for the low grade fuel is closed, causing a greater suction and feed through the carburetor of the high grade fuel and a consequently richer mixture for the starting action.

In the modification disclosed by Figure 3 a form of auxiliary valve is shown which is particularly applicable to an overhead valve type of engine and is designed for application to the spark plug opening, as explained in connection with Figures 1 and 2. In this form of the invention the auxiliary valve chamber 63 is provided with an intake valve 64 disposed opposite a spark plug 65. An intake passage 66 extends from a manifold 67 to the valve 64 and a firing passage 68 extends from the chamber 63 to the upper portion of the cylinder, as usual in this class of engines.

This chamber is shown as provided with radiator blades 69 while an intake valve stem 70 is actuated by a lifter arm 71 carried by a tappet rod 72 acting upon a pivoted rocker 73 the opposite end of which actuates the main intake valve 74 forming part of the usual engine construction. In this form of the invention, the rod 72 may be actuated by the valve lifters as before described.

In the modified form of the invention shown in Figure 5 the engine head is adapted to be replaced by a water cooled head and auxiliary valve chamber effecting the functions before described, but substituting a water cooling for the radiator blades. In this form the engine 75 is provided with a piston 76, and an intake valve 77 of the usual construction. The head 78 is provided with any desired configuration of water passage 79 and an intake valve 80 for fuel of high volatility is disposed in a valve chamber 81 opposite a spark plug 82 and directly communicating with the upper portion of a fuel chamber 83 by a passage 84. The stem 85 of the valve 80 is actuated by a rocker 86 and a push rod 87 having an operative connection 88 with a lifter 89 of the valve 77 similar in character and operation to that described in connection with Figures 1 and 2.

In Figure 6 a modified form of the auxiliary valve is shown and provides a plurality of passages from the explosion chamber for the fuel of high volatility leading to the cylinder head chamber containing the fuel of lower volatility. This structure distributes the flame and pressure from the initial explosive action over a large area and is particularly adapted for extra large motors or as an intake valve in the type of engine provided with a valve at its head. In this form of the invention the ordinary engine head is replaced, as is explained in connection with Figure 5, by a head 90 formed with a water jacket 91 and with an auxiliary valve chamber 92 provided at one side with an intake valve 93 and opposite thereto with a spark plug 94. From the chamber 92 a series of passages 95 extend downward to the main valve chamber 96 adapted to be charged with a fuel of low volatility. These passages may be arranged in any desired manner, for instance, radiated from the axis of the chamber 92 as shown. A valve stem 97 is adapted to be actuated in any desired manner, for instance, as shown in Figure 5, and a suitable fuel intake 98 communicates with the valve 93.

In the operation of the invention it will be apparent that the upward stroke of the engine piston, after exhaust, compresses the charge of fuel of low volatility within the chamber directly above the piston, such fuel being admitted during the usual timed valve opening action for the main intake valve. Simultaneously with the opening of this valve, the auxiliary valve admits a charge of fuel of high volatility through the connection shown for simultaneous operation of the valves, and this high grade charge is admitted to be fired from the auxiliary valve chamber superposed above the ordinary ignition chamber of the engine.

The effect of such firing is to create a supplemental pressure upon the low grade fuel which further compresses the same and causes it to develop a greater power in its expansive action. The firing action also carries a flame causing combustion of the low grade fuel to effect such expansion and the operation just described is substantially instantaneous. By disposing the auxiliary valve chamber in position to discharge through a restricted passage upon the upper surface of the low grade charge an intermingling of these fuels is prevented and this is of importance in maintaining the high grade charge undiluted to effect a clean and sharp explosion, producing both pressure upon and ignition of the low grade fuel. As before described the charges of fuel may be controlled by throttling action to enrich the mixture at the starting of the engine and the intake valves are of relatively different area or capacity so as to properly proportion the charges of high and low grade fuel during the normal and continued operation of the engine.

The disposition of the intake valve for the fuel of high volatility in alinement with the spark plug renders the same easy of access and the discharge from the combustion chamber of this valve is in a substantially direct line upon the main body of low grade fuel.

The invention provides a construction applicable to ordinary types of explosive gas engines without affecting the construction thereof, by which fuel of low volatility can be successfully used and the fullest power is obtained by the supplemental compression of the low grade charge before the same is ignited. If this latter charge be compressed to such a degree that its heat is equivalent to that of the exploded high grade charge it would be evident that the expansion is secured by a combustion of the fuel rather than an explosive action thereof.

While the specific details of construction have been shown and described in the disclosure of the invention, it is not confined thereto, as changes and alterations may be made therein without departing from the spirit of the invention as defined in the following claims.

What I claim is:

1. In an internal combustion engine, a piston and cylinder having a normal intake valve, a cylinder head provided with an auxiliary intake valve, a rock arm for actuating said auxiliary valve, a rod for operating said arm, a rock shaft connected to lift said rod, and means carried by said shaft for actuation by the controlling means for the normal intake valve.

2. In an internal combustion engine, a piston and cylinder having a normal intake valve, a casing enclosing controlling means for said valve, a cylinder head provided with an auxiliary valve casing, an intake valve and ignition means in said casing, a rock arm for actuating said auxiliary intake valve, a push rod engaging said arm, a cover plate for said casing, a rock shaft journaled in said plate, and means carried by said shaft for actuating said rod and engaging the controlling means for the normal intake valve.

3. In an internal combustion engine, a piston and cylinder having a normal intake valve, a casing enclosing controlling means for said valve, a cylinder head provided with an auxiliary valve casing, an auxiliary intake valve and ignition means within said casing, a bell crank lever engaging the stem of the auxiliary intake valve, a push rod engaging the opposite arm of said lever, a cover plate for said casing provided with an elongated bearing, a rock shaft disposed in said bearing and having a crank member connected to said rod, and an actuating finger upon said shaft disposed beneath the stem of the normal intake valve.

4. In an internal combustion engine, an auxiliary valve attachment adapted for application to the spark plug opening of said engine and comprising a casing provided with an intake valve and ignition means, and actuating means for said auxiliary intake valve constructed and arranged for cooperation with the controlling means for the normal intake valve of the engine.

5. In an internal combustion engine, an auxiliary valve attachment adapted for application to the spark plug opening thereof and comprising a casing, an auxiliary intake valve and ignition means within said casing, a bracket supported upon the engine frame carrying means to actuate said valve, and an operative connection from said actuating means disposed to be engaged by the controlling means for the normal intake valve of said engine.

In testimony whereof I affix my signature.

WILLIAM PAUL RUDKIN.